April 21, 1953  B. GROSS  2,635,785
SEALED DOOR ASSEMBLY
Filed Oct. 30, 1951
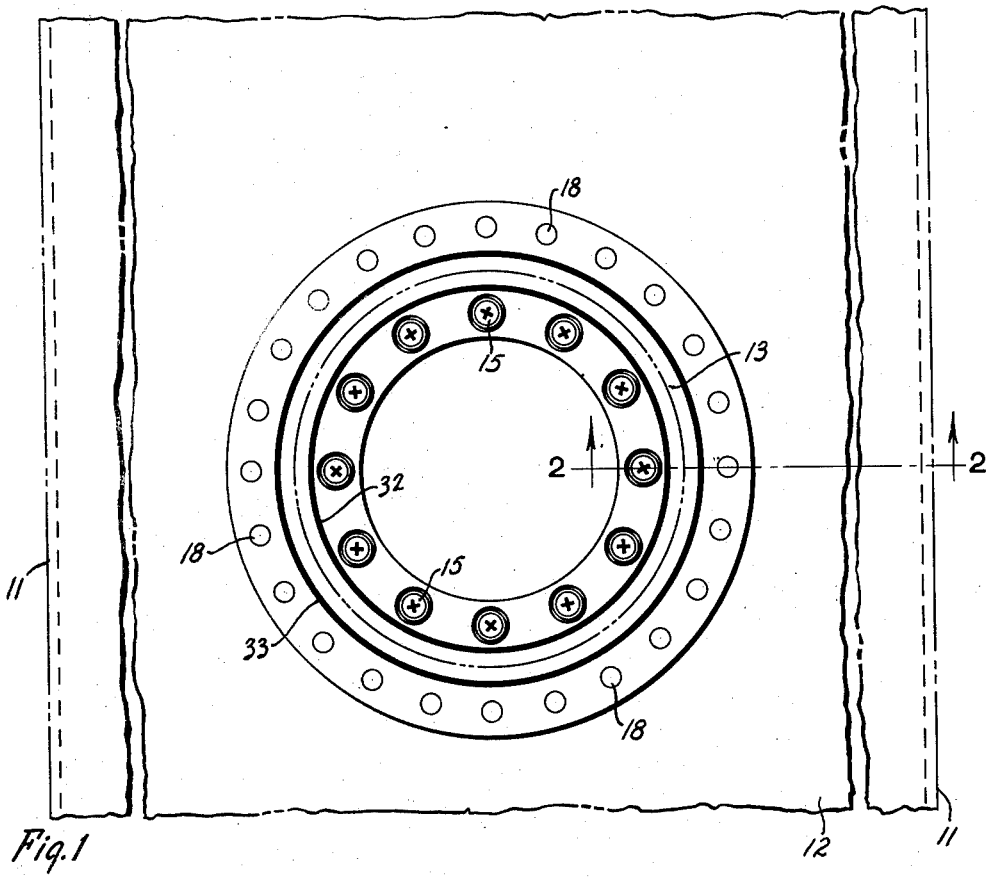
Fig. 1
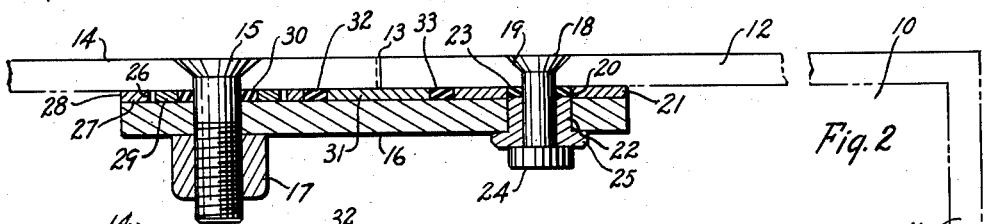
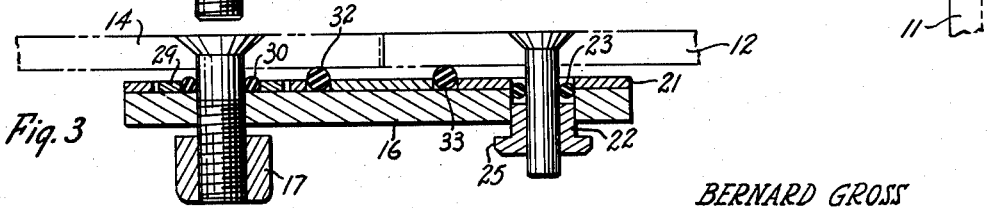
Fig. 3
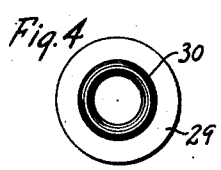
Fig. 4
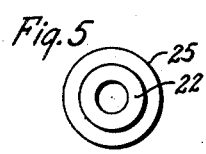
Fig. 5
BERNARD GROSS
INVENTOR.
BY S. Tierney Jr
ATTORNEY Patented Apr. 21, 1953

2,635,785

UNITED STATES PATENT OFFICE 2,635,785

SEALED DOOR ASSEMBLY

Bernard Gross, San Diego, Calif., assignor to Rohr Aircraft Corporation, San Diego, Calif., a corporation of California Application October 30, 1951, Serial No. 253,773

4 Claims. (Cl. 220—46)

This invention relates to a sealed door assembly adapted for closing an opening in any vessel as, for example, a fuel or lubricating oil tank or the pressurized cabin of an airplane.

It is an object of the invention to provide a door assembly whose main parts may be stamped out of sheet metal and are therefore inexpensive to construct.

Another object is to provide a door assembly which may be easily installed without the use of specially designed fasteners.

A further object is to provide against leakage along one or more of the fasteners used in the installation of the door assembly.

Another object is to provide a door assembly adapted for use in airplanes in which the outer surface of the assembly is smooth and even for aerodynamic reasons.

Other objects will become apparent as the description of the door assembly proceeds. For a better understanding of the invention, reference is made to the accompanying drawings, in which:

Figure 1 is a top view of a door assembly embodying the invention,

Figure 2 is a sectional view through a portion of the door of Figure 1 on line 2—2, taken on an enlarged scale, Figure 3 is a sectional view showing certain parts of Figure 2 partly assembled, Figure 4 is a top view on an enlarged scale of a screw sealing means and, Figure 5 is a top view on an enlarged scale of one of the bushings used in the door assembly.

The invention is shown in connection with a closed vessel 10 having sidewalls 11 and a top wall 12 having a circular opening 13. The vessel 10 may be constructed entirely of metal and may be a container for holding fuel or lubricating oil on an aircraft, a pressurized compartment of an airplane or a vessel of any other type. Mounted within opening 13 is a circular door 14 secured in position by a set of flat headed screws 15, those illustrated being the Phillips type. The screws pass freely through openings in a retainer ring or support plate 16 and are threaded into nuts 17. Ring 16 is riveted to top wall 12 by a set of rivets 18, the openings 19 in wall 12 being countersunk so that the heads of the rivets are flush, as illustrated. Each rivet passes through a circular hole 20 in a spacer ring 21 and a hollow cylindrical bushing 22 which extends through support 16 and a short distance into ring 21. A torus shaped ring 23 of rubber-like material is deformed into rectangular shape and sealing contact with the stem of rivet 18, with spacer ring 21, wall 12 and with bushing 22 when the ends 24 of the rivets are driven and set against the ends of bushings 22, each of which has a short flange 25 which becomes seated against the lower face of ring 16.

Each screw 15 passes through a hole 26 stamped in an inner spacer ring 27 whose inner edge 28 is even with the edge of retainer ring 16. Hole 26 is of a diameter somewhat greater than the diameter of a circular metal washer 29 which encloses a torus shaped gasket 30 of rubber-like material. Upon tightening screws 15, gasket 30 is deformed into rectangular shape and compressed into sealing contact with the smooth portion of screw 15 with door 14 and with plate 16. Disposed behind opening 13 is a floating metal ring 31 against whose inner and outer edges are seated the torus shaped gaskets 32, 33 of rubber-like material. Gasket 32 upon assembly of the door is deformed into sealing contact with door 14, ring 27, retainer 16 and ring 31 while gasket 33 is compressed into sealing contact with wall 12, ring 31, retainer 16 and spacer ring 21. Should one of the gaskets 23 for any reason become defective and permit leakage of fluid past it, such leakage flowing towards the door would be stopped by gasket 33 and thus prevented from escaping through opening 13. Or, if one of the gaskets 30 should become defective, any leakage past it would be stopped by gasket 32 before it could reach opening 13. While door 14 and wall 12 are shown in Figure 1 made of clear, transparent plastic to simplify the drawing, it will be understood that vessel 10 including top wall 12 may be made of sheet metal and that door 14 and rings 16, 21, 27 and 31 may be stamped from sheet metal as, for example, aluminum or stainless steel in a punch press.

The several gaskets referred to are made of material which is not injured or dissolved by the liquid or gas in vessel 10 and the term "rubber-like" is to be understood as including resilient, synthetic rubber compounds as well as rubber.

Any suitable means (not shown) may be used to secure the several nuts 17 to ring 16 so that they will not rotate when screws 15 are turned. To secure access to the opening in the vessel, it is only necessary to loosen screws 15 and lift the door 14. To close the vessel, door 14 is replaced and screws 15 tightened, the compression of gaskets 33 and 32 causing the opening in vessel 10 to be hermetically sealed.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. Means for closing the circular opening in the wall of a vessel comprising: a circular door having a peripheral edge in the plane of the opening and disposed close to the marginal wall of the opening, the outer face of the door being substantially flush with the outer face of the vessel wall; a support in the vessel and overlapping said door and vessel wall; a metal ring in engagement with said support and extending along the door and wall of the vessel; torus shaped gaskets of resilient material in engagement respectively with the inner and outer peripheral edges of said metal ring; a set of spaced apart fasteners passing through said support and the vessel wall; and a second set of spaced apart fasteners passing through said support and said door, said sets of fasteners being arranged to cause said support to compress said gaskets into sealing contact with said door and vessel wall.

2. Closure means as claimed in claim 1; in which circular gaskets of resilient material are disposed within the vessel and around each of said fasteners in sealing contact therewith.

3. Means for closing the circular opening in the wall of a vessel comprising: a circular door having a peripheral edge in the plane of the opening and disposed close to the marginal wall thereof; a support disposed in the vessel and overlapping said door and vessel wall; inner, middle and outer circular metal rings of the same thickness, said inner ring being in contact with said support and door, said outer ring being in contact with said support and the vessel wall and said middle ring being in contact with said support, said door and the vessel wall; a continuous circular gasket of resilient material disposed between and in contact with said inner and middle rings; a second continuous circular gasket of resilient material disposed between and in contact with said middle and outer rings, and a plurality of spaced apart removable securing screws passing through said door and support.

4. Closure means as claimed in claim 3; in which said securing screws and support are arranged to compress said gaskets into sealing contact with said door and the wall of the vessel respectively.

BERNARD GROSS.

References Cited in the file of this patent

UNITED STATES PATENTS

| Number | Name | Date |
|---|---|---|
| 127,639 | Otto | June 4, 1872 |
| 588,063 | Hewens | Aug. 10, 1897 |
| 2,131,762 | Smith | Oct. 4, 1938 |
| 2,476,074 | Unger | July 12, 1949 |
| 2,517,012 | Miller | Aug. 1, 1950 |
| 2,590,803 | Unger | Mar. 25, 1952 |

FOREIGN PATENTS

| Number | Country | Date |
|---|---|---|
| 503,860 | Germany | July 30, 1930 |